United States Patent
Eismark et al.

(10) Patent No.: US 8,646,428 B2
(45) Date of Patent: Feb. 11, 2014

(54) PISTON POSITIONED FOR RECIPROCAL MOVEMENT IN A COMBUSTION ENGINE CYLINDER

(75) Inventors: Jan Eismark, Göteborg (SE); Michael Balthasar, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 0 days.

(21) Appl. No.: 13/579,611

(22) PCT Filed: Feb. 18, 2011

(86) PCT No.: PCT/EP2011/000780
§ 371 (c)(1),
(2), (4) Date: Oct. 8, 2012

(87) PCT Pub. No.: WO2011/101155
PCT Pub. Date: Aug. 25, 2011

(65) Prior Publication Data
US 2013/0047950 A1    Feb. 28, 2013

(30) Foreign Application Priority Data
Feb. 18, 2010  (SE) ...................................... 1000163

(51) Int. Cl.
*F02F 3/00*    (2006.01)
(52) U.S. Cl.
USPC .......... 123/193.6; 123/298; 123/301; 123/305
(58) Field of Classification Search
USPC ............................... 123/193.6, 298, 301, 305
See application file for complete search history.

(56) References Cited

U.S. PATENT DOCUMENTS

| | | | | |
|---|---|---|---|---|
| 5,215,052 | A * | 6/1993 | Augustin | 123/276 |
| 7,918,206 | B2 * | 4/2011 | Eismark et al. | 123/298 |
| 7,942,126 | B2 * | 5/2011 | Zoller | 123/298 |
| 8,499,735 | B2 * | 8/2013 | Eismark et al. | 123/193.4 |

FOREIGN PATENT DOCUMENTS

| | | |
|---|---|---|
| DE | 102006020642 A1 | 11/2007 |
| EP | 1605147 A1 | 12/2005 |
| JP | 4103827 A | 4/1992 |
| JP | 4262020 A | 9/1992 |
| JP | 5001542 A | 1/1993 |
| JP | 2000274247 A | 10/2000 |
| WO | 2009058055 A1 | 5/2009 |

OTHER PUBLICATIONS

International Search Report (Apr. 15, 2011) for corresponding International application No. PCT/EP2011/000780.

* cited by examiner

*Primary Examiner* — Marguerite McMahon
*Assistant Examiner* — James Kim
(74) *Attorney, Agent, or Firm* — WRB-IP LLP

(57) ABSTRACT

A piston is positioned for reciprocal movement in a combustion engine cylinder. Halfway between flame plume impingement areas are arranged a first type of protrusions protruding into the combustion chamber and having a smooth form adapted for preserving kinetic energy in a flame plume. Each of the first type of protrusions has a shape of a longitudinal ridge that extends only in the outer bowl area. The first type of protrusions have a left side flank and a right side flank of the ridge when seen from the injector. The left side flank is formed differently compared to the right side flank in order to redirect the movement of a flame plume progressing towards the left side flank in a plane perpendicular to the reciprocal movement, differently compared to corresponding flame plume progressing, towards the right side flank.

6 Claims, 6 Drawing Sheets

PISTON POSITIONED FOR RECIPROCAL MOVEMENT IN A COMBUSTION ENGINE CYLINDER

BACKGROUND AND SUMMARY

The present invention relates to a device for controlling the combustion process in a combustion engine. The invention relates to such a device for reducing soot emissions but also carbon monoxide and hydrocarbon in combustion engines in which the fuel/cylinder gas mixture is ignited by compression heat generated in the cylinder. The invention also relates to a device having a high efficiency combustion.

Soot particles (or particulates) are a product which, during combustion, can both be formed and subsequently oxidized into carbon dioxide (CO2). The quantity of soot particles measured in the exhaust gases is the net difference between formed soot and oxidized soot. The process is very complicated. Combustion with fuel-rich, fuel/air mixture with poor mixing at high temperature produces high soot formation. If the formed soot particles can be brought together with oxidizing substances such as oxygen atoms (0), oxygen molecules (02), hydroxide (OH) at sufficiently high temperature for a good oxidation rate, then a greater part of the soot particles can be oxidized. In a diesel engine, the oxidation process is considered to be in the same order of magnitude as the formation, which means that net soot production is the difference between formed quantity of soot and oxidized quantity of soot. The net emission of soot can therefore be influenced firstly by reducing the formation of soot and secondly by increasing the oxidation of soot. Carbon monoxide emissions (CO) and hydrocarbon emissions (HC) are normally very low from a diesel engine. Yet the percentages can rise if unburnt fuel ends up in relatively cool regions. Such regions are, in particular, zones with intense cooling located close to the cylinder wall. Another example is cavities between piston and cylinder lining.

Nitrogen oxides (NOx) are formed from the nitrogen content in the air in a thermal process which has a strong temperature dependency and depends on the size of the heated-up volume and the duration of the process.

A combustion process in which the fuel is injected directly into the cylinder and is ignited by increased temperature and pressure in the cylinder is generally referred to as the diesel process. When the fuel is ignited in the cylinder, combustion gases present in the cylinder undergo turbulent mixing with the burning fuel, so that a mixture-controlled diffusion flame is formed. The combustion of the fuel/gas mixture in the cylinder gives rise to heat generation, which causes the gas in the cylinder to expand and which hence causes the piston to move in the cylinder. Depending on a number of parameters, such as the injection pressure of the fuel, the quantity of exhaust gases recirculated to the cylinder, the time of injection of the fuel and the turbulence prevailing in the cylinder, different efficiency and engine emission values are obtained.

Below follows an example of state of the art arrangement attempting to lower both soot and NOx-emissions by controlling the flame, and trying to brake the well known "trade off" between soot emissions and nitrogen oxide emissions, which is typical of the diesel engine, and which "trade-off" is difficult to influence. The majority of measures which reduce soot emissions increase the nitrogen oxide emissions.

WO2009/058055 discloses as combustion engine with a combustion chamber comprising a piston, an injector with plurality of orifices arranged to inject spray/flame plumes, which impinge on a piston outer bowl section during most of the injection. Between spray/flame plume impingement areas and in a plane substantially perpendicular to reciprocal piston movement are arranged a first type of protrusions protruding into the combustion chamber, having a smooth form for preserving kinetic energy in the flame and for redirecting circumferential flame progress mainly towards a center axis of the piston with minimal flame-to-flame interaction. A second type of protrusions are arranged in the impingement areas, being adapted for redirecting flame progress into a circumferential flame progress direction in a plane substantially perpendicular to said reciprocal piston movement and with minimal flame-to-piston wall interaction and minimal kinetic energy loss. It is mentioned that both said protrusion types can be adapted to swirl by having an asymmetrical form that is swept to a certain degree in the flowing direction of the swirl. This is in order to meet the spray plume affected by said swirl in the right position when it impinges said impingement area.

Due to coming future emission legislation for combustion engines there is a need to further lower the emission levels in order to meet coming demands.

It is, therefore, desirable to overcome the deficiencies of the prior art and to provide an internal combustion engine containing a combustion chamber arrangement designed to further reduce undesirable soot emissions. This is done by promoting further afteroxidation of remaining soot. The soot reduction is especially important for fuels such as for example diesel. The invention further contributes to the reduction of carbon monoxide (CO) emissions and hydrocarbon (HC) emissions. The reduction of CO and HC becomes especially important for fuels such as for example DME (dimethyl ether).

It is also desirable to increase efficiency. The design of the combustion chamber according to an aspect of the present invention results in a faster combustion.

Known effects when using, for example, an increased amount of Exhaust Gas Recirculation can at least partly be compensated for by aspects of the present invention.

According to an aspect of the invention, a piston is positioned for reciprocal movement in a combustion engine cylinder between a bottom dead center position and a top dead center position, said piston including a piston crown comprising, an upper surface facing a combustion chamber, said piston crown containing a piston bowl formed by an outwardly opening cavity, said piston bowl comprising an outwardly flared outer bowl section having a concave curvilinear shape in cross section, at least one intake port arranged to provide the combustion chamber with intake air substantially without swirl, an injector arranged to inject fuel into the combustion chamber from a position adjacent a geometrical centre of said combustion chamber and having an impingement area of a progressing flame plume in said outer bowl section, and where substantially half way between said impingement areas and in a plane substantially perpendicular to said reciprocal movement are arranged a first type of protrusions protruding into the combustion chamber and having a smooth form adapted for preserving kinetic energy in a flame plume and where each of said first type of protrusions has a shape of a longitudinal ridge that extends only in the outer bowl area, and where said first type of protrusions having a left side flank and a right side flank of said ridge when seen from said injector.

The invention is characterized in that said left side flank is formed differently compared to said right side flank in order to redirect the movement of a flame plume progressing towards said left side flank in a plane perpendicular to said reciprocal movement differently compared to corresponding flame plume progressing towards said right side flank.

According to one embodiment of the invention a top of said ridge having a form that is swept to a right or left direction, when seen from said injector and in a plane perpendicular to said reciprocal movement, and where propagation of said top follows a plane that is parallel to said reciprocal movement and where said plane coincide with a geometrical central axis of the combustion engine cylinder.

According to another embodiment of the invention an upper part of said ridge, positioned away from a bottom of said piston bowl, having a form that is swept in one first direction in a plane perpendicular to an axis of reciprocation of the piston and when seen from said injector, and a lower part of said ridge, positioned close to said bottom of said piston bowl, having a form that is swept in an opposite direction to said first direction when seen from said injector and in another plane perpendicular to said axis of reciprocation of the piston, and where a distance parallel to an axis of reciprocation of the piston and between said planes is at least half of a total length of said ridge.

In a further embodiment of the invention one of said upper or lower parts swept in said first direction having a first top of ridge section where extension of said first top of ridge section coincides with a first plane that is parallel to said reciprocal movement and where said first plane coincides with said geometrical central axis of the combustion engine cylinder, and where the other of said upper or lower parts swept in said opposite direction having a second top of ridge section where extension of said second top of ridge section coincides with a second plane that is also parallel to said reciprocal movement and where said second plane also coincides with said geometrical central axis of the combustion engine cylinder, and where a first distance between said first plane and said second plane, measured substantially at a position of said ridge or first type of protrusion, is less than a second distance corresponding to a base width of said first type of protrusions at a portion of said first type of protrusions having the biggest width.

According to another embodiment of the invention having a top of said ridge where extension of said top of said ridge coincides with a plane having an angle to a geometrical central axis of the combustion engine cylinder and where said plane coincides only in one point with said geometrical central axis of the combustion engine cylinder. In a further embodiment said angle is between 0 and 30 degrees.

In a further embodiment of the invention a second type of protrusions is arranged in the impingement area between said first type of protrusions, and where said second type of protrusions being adapted for redirecting flame progress directed towards the impingement area mainly into a circumferential flame progress direction in a plane substantially perpendicular to said reciprocal movement and with minimal flame-to-piston wall interaction and minimal kinetic energy loss.

In a further embodiment of the invention said first type of protrusions are arranged for redirecting circumferential flame progress mainly towards a center axis of the piston with minimal flame-to-flame interaction.

BRIEF DESCRIPTION OF THE DRAWINGS

The present invention will be described in greater detail below with reference to the accompanying drawings which, for the purpose of exemplification, shows further preferred embodiments of the invention and also the technical background, and in which:

FIG. 2b diagrammatically shows an alternative embodiment according to prior art of the embodiment in FIG. 2a.

DETAILED DESCRIPTION

Figure 1:
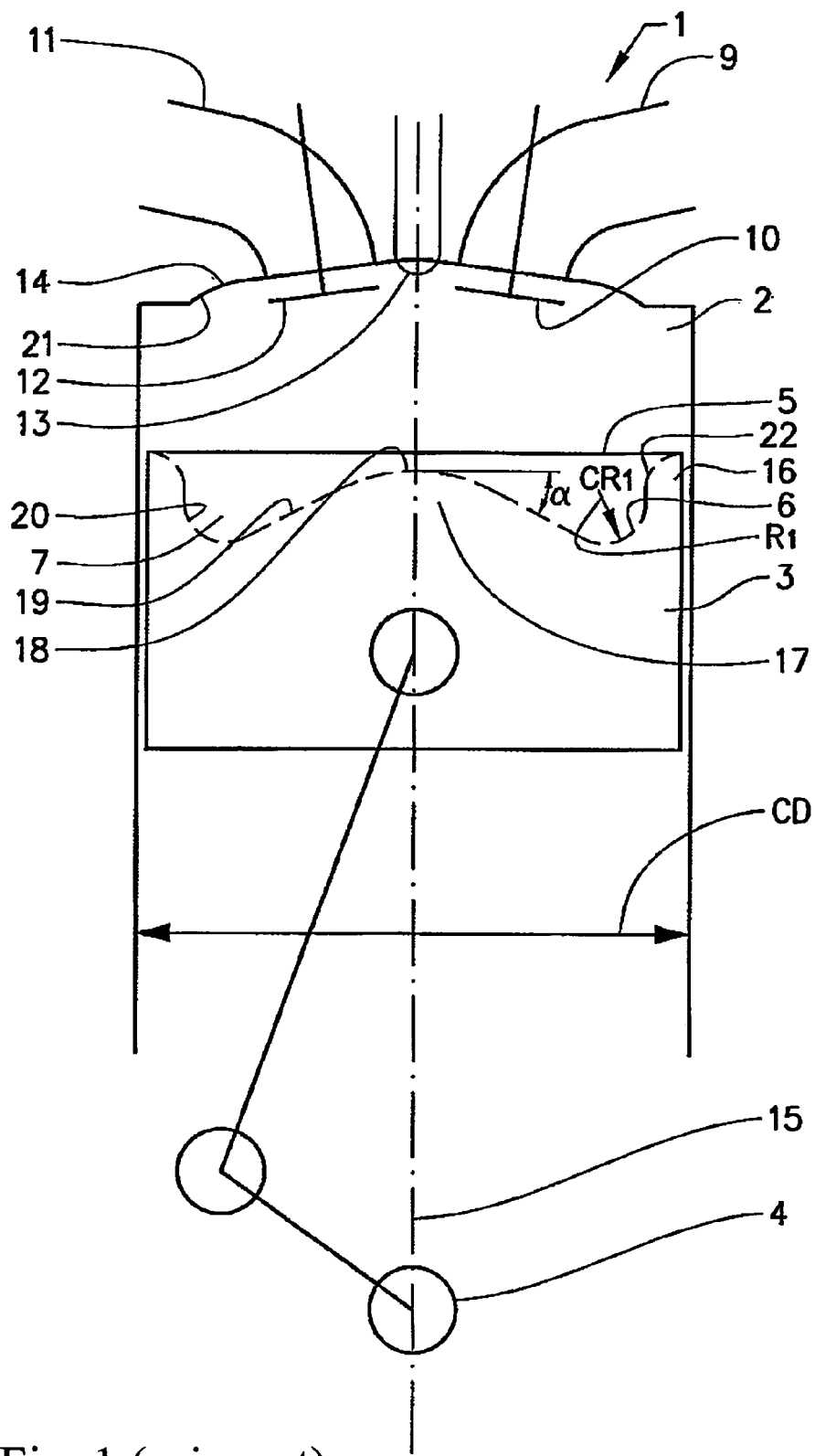
FIG. 1 diagrammatically shows a cut view of a prior art piston and cylinder in a combustion engine, where the invention can be implemented.

In FIG. 1, a diagrammatic view is shown of a combustion engine 1 which is designed to work according to the diesel process. The engine 1 comprises a cylinder 2 and a piston 3, which reciprocates in the cylinder 2 and is connected to a crankshaft 4 so that the piston 3 is set to reverse in the cylinder 2 at an upper and lower dead centre position. As is also common, one end of the cylinder cavity is closed by a engine cylinder head 14. The piston 3 is provided in its upper surface 5 with a piston bowl 6, which forms a combustion chamber 7, together with inner surface 21 of a cylinder head 14 and walls of the cylinder 2. In the cylinder head 14 one or more induction ports 9 are arranged. The connection between a respective induction port 9 and the cylinder 2 can be opened and closed with an induction valve 10 disposed in each induction port 9. Arranged in the cylinder head are also one or more exhaust ports 11. The connection between a respective exhaust port 11 and the cylinder 2 can be opened and closed with an exhaust valve 12 disposed in each exhaust port 11. The opening and closing of valves 10 and 11 may be achieved by a mechanical cam or hydraulic actuation system or other motive system in carefully controlled time sequence with the reciprocal movement of piston 3.

In the cylinder head 14 there is disposed at least one fuel injector 13, through which fuel is injected into the cylinder 2 as a fuel spray so that the fuel is mixed with gas compressed in the cylinder 2 to form a fuel/gas mixture, which is ignited by compression heat generated in the cylinder 2. The ignited part of the spray forms a flame plume. During injection a part of the spray closest to the injector with newly injected fuel has not yet started to burn. The fuel is preferably injected with a very high pressure. Injector 13 includes a plurality of small injection orifices (not shown), formed in the lower end of a nozzle assembly of the injector 13 for permitting the high pressure fuel to flow from a nozzle cavity of the injector 13 into the combustion chamber 7 with a very high pressure to induce thorough mixing of the fuel with the high temperature, compressed charge air within combustion chamber 7. It should be understood that injector 13 may be any type of injector capable of injecting high pressure fuel through a plurality of injector orifices in to the combustion chamber 7 in the manner described hereinbelow. Moreover, injector 13 may include a mechanically actuated plunger housed within the injector body for creating the high pressure during an advancement stroke of the plunger assembly.

Alternatively, the injector 13 may receive high pressure fuel from an upstream high pressure source such as in a pump-line-nozzle system including one or more high pressure pumps and/or a high pressure accumulator and/or a fuel distributor. The injector 13 may include an electronically actuated injection control valve which supplies high pressure fuel to the nozzle valve assembly to open a nozzle valve element, or controls the draining of high pressure fuel from the nozzle valve cavity to create a pressure imbalance on the nozzle valve element thereby causing the nozzle valve element to open and close to form an injection event. For example, the nozzle valve element may be a conventional spring-biased closed nozzle valve element actuated by fuel pressure. The fuel injector 13 is preferably centrally disposed in the cylinder head so a geometrical central axis of the fuel injector coincide with a geometrical central axis 15 of the cylinder, which geometrical central axis also is an axis of reciprocation of the piston 3, as shown in FIG. 1.

The combustion engine 1 shown in FIG. 1 can work according to the four-stroke and/or two-stroke principle. The engine 1 preferably comprises a plurality of cylinders 2, each provided with a piston 3, where each piston 3 is connected to a common crankshaft 4 through a connecting rod and thus causing the piston to reciprocate along a rectilinear path within the cylinder 2 as the engine crankshaft 4 rotates.

FIG. 1 illustrates the position of the piston 3 circa 45 degrees before a top dead center (TDC) position. A TDC position is achieved when the crankshaft is positioned to move the piston to the furthest most position away from the rotational axis of the crankshaft. In the conventional manner, the piston moves from the top dead center position to a bottom dead center (BDC) position when advancing through intake and power strokes. For purposes of this disclosure, the words "upward" and "upwardly" correspond to the direction away from the engine crankshaft and the words "down" and "downwardly" correspond to the direction toward the crankshaft of the engine or bottom dead center position of the piston.

At an uppermost, TDC position, piston 3 has just completed its upward compression stroke during which the charge air allowed to enter the combustion chamber 7 from induction port 9 is compressed thereby raising its temperature above the ignition temperature of the engine's fuel. This position is here considered as the 360 degrees position commencing the expansion/combustion stroke of the complete 720 degrees four stroke cycle of piston 3. The amount of charge air that is caused to enter the combustion chambers may be increased by providing a pressure boost in the engine's intake manifold. This pressure boost may be provided, for example, by a turbocharger (not shown driven by a turbine powered by the engine's exhaust, or maybe driven by the engine's crankshaft. The pressure boost may also be provided by a two-stage turbocharger, a turbo-compound arrangement etc.

The upper portion of piston 3 may be referred to as the piston crown 16. Piston crown 16 includes the upper surface 5 partially forming combustion chamber 7 and a piston bowl 6 formed by an upwardly opening cavity. Piston bowl 6 includes a projecting portion 17 preferably positioned at or near the center of bowl 6. Projecting portion 17 includes a distal end 18 positioned, in the preferred embodiment shown in FIG. 1, at the center of piston bowl 3 and thus positioned along the axis of reciprocation 15 of piston 3.

Projecting portion 17 also includes an inner bowl floor section 19 extending from projecting portion 17 downwardly at an inner bowl floor angle a from a plane perpendicular to the axis of reciprocation of piston 3 as shown in FIG. 1. Outer bowl section 20 is designed with a particular radius Rx and a particular location for a center of radius CRi.

Figure 2A:
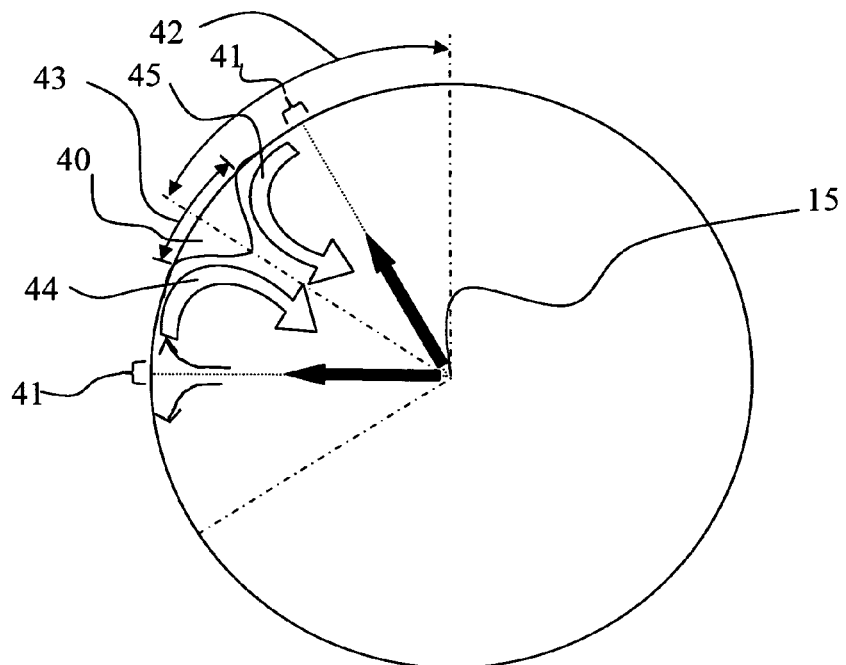
FIG. 2a diagrammatically shows a top view of the piston in FIG. 1 with spray/flame flows according to prior art.

FIG. 2a shows a prior art embodiment with only a first type of protrusion 40 evenly distributed around the circumference of the outer bowl 6. Said first type of protrusions are arranged approximately halfway between the impingement areas 41 of two adjacent flame plumes (in FIGS. 2a and 2b indicated by the biggest black arrows). Said first type of protrusions has a form of a ridge that extends in the vertical direction, thus in FIGS. 2a and 2b the first type of protrusions 40 are seen in a cross-section from above.

Preferably a ridge of the first type of protrusion 40 extends in length corresponding to the length of an impingement area. Thus, said ridge of said first type of protrusion extends at least from a first position arranged in a first horizontal plane that is common for said first impingement point and up to a second position arranged in a second horizontal plane that is common for said second impingement point. The mentioned planes are perpendicular to the reciprocal movement of said piston 3 or geometrical central axis 15 of the cylinder.

Each half of a width 43 of the base of a first type of protrusion or ridge can be extended up to, for example, approximately ⅓ of a total spray sector distance 42 along the circular shape of an outer bowl section.

Figure 2B:
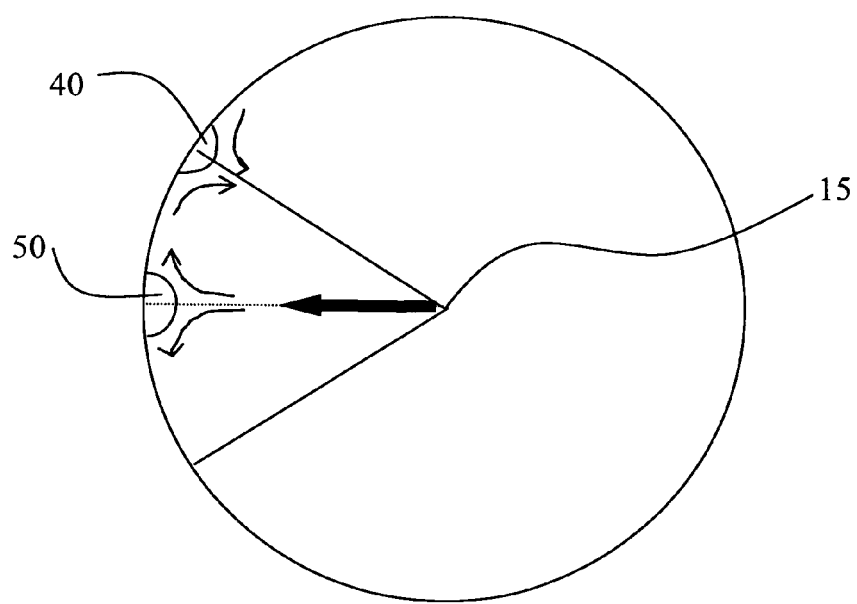

FIG. 2b shows an embodiment with said first type of protrusion and a second type of protrusion 50. Said second type of protrusion redirects the horizontal or substantially horizontal (dependent of how angled the injected flame plume is in relation to a horizontal plane) movement of the flame from a direction towards the outer bowl area (impingement area) to tangential directions.

According to prior art the overall dimensions, shape and/or relative positioning of the combustion chamber components and features (including said protrusions) can be shaped such that the momentum of the fuel spray/burning cylinder gas flame is preserved as long as possible on its way from the injector.

Further, the dimensions, shape and/or relative positioning of the combustion chamber components and features can be shaped such that a predetermined level of balance between vertical (mainly upward) and tangential momentum (directed in a plane perpendicular to the axis 15) of the fuel spray/flame plume is achieved.

This present invention is particularly directed towards the enhancement of the redirection of the horizontal movements of the flame plume toward the axis 15, i. e. when the flame changes direction from being directed towards the outer bowl to being directed in said tangential direction, and further the redirection of the tangential movement to a movement directed toward said axis 15, which is seen from above in FIGS. 2a and 2b and indicated by the white big arrows 44, 45 in FIG. 2a. According to prior art a flow 44 and 45 (indicated by said white arrows in FIG. 2a) of two flame plumes,' of which propagation can be regarded as minor inverted, propagate towards each side flank of a protrusion 40 substantially in the same direction and in the same manner. Thus, both said flows are redirected in the same way but mirror inverted, since side flanks of said first type of protrusion 40 are shaped in the same way. Said first type of protrusion 40 has a symmetric form.

The engine piston of the present invention includes first type of protrusions shaped, as described hereinbelow, to advantageously further reduce particulate matter (PM) with maintained fuel economy and increased combustion efficiency. The invention is especially directed to reduce soot emissions. Soot is one fraction of PM. The inventive first type of protrusion gives the possibility to redirect the flow direction of the flame plume in directions that has not been suggested before. The inventive first type of protrusions can be used in order to achieve better mixing of the combustion gases and also to decrease or eliminate identified stagnation zones in a combustion chamber.

Figure 3:
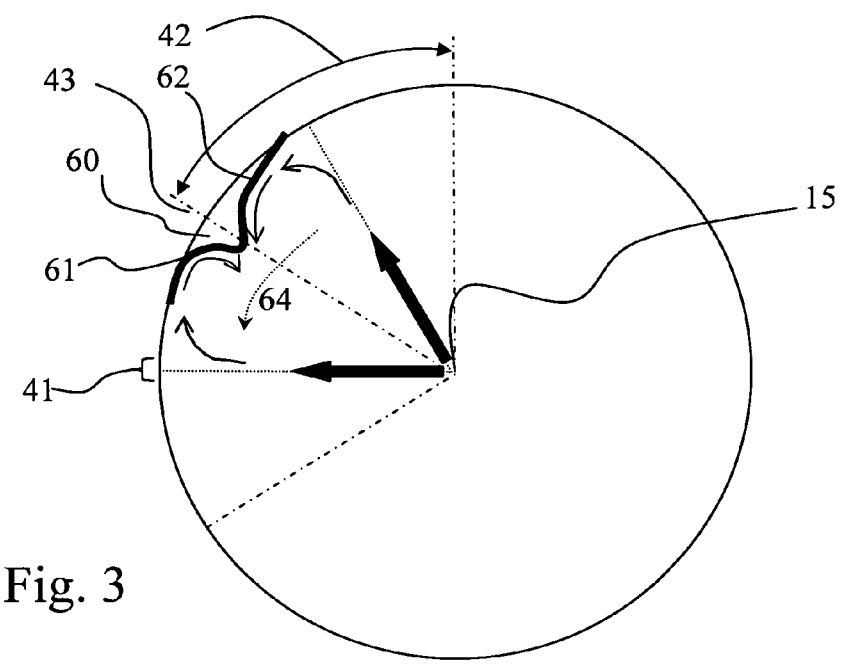
FIG. 3 diagrammatically shows a top view of the piston according to an embodiment of the invention with spray/flame flows.

FIG. 3 discloses a first type of protrusion 60 according to one embodiment of the invention. The first type of protrusion 60 is protruding into the combustion chamber and having a smooth form adapted for preserving kinetic energy in a flame plume. The first type of protrusion has a shape of a longitudinal ridge that extends only in the outer bowl area. This can be seen better in FIG. 4 where only a first type of protrusion 70 similar to the one in FIG. 3 is disclosed. In FIG. 3 the first type of protrusion 70 is chopped in the upper 74 and lower 73 end in order to better see the three-dimensional structure of the first type of protrusion 70. Also this first type of protrusion has a shape of a longitudinal ridge that extends only in the outer bowl area in a plane substantially parallel to said reciprocal movement. Said first type of protrusion 70 comprises a left side flank 71 and a right side flank 72 of said ridge when seen from an injector (not disclosed in FIGS. 3 and 4) or the geometrical central axis 15 of the cylinder in a plane perpendicular to the reciprocal movement. Corresponding left side flank 61 and right side flank 62 is disclosed in FIG. 3 as well.

Figure 5:
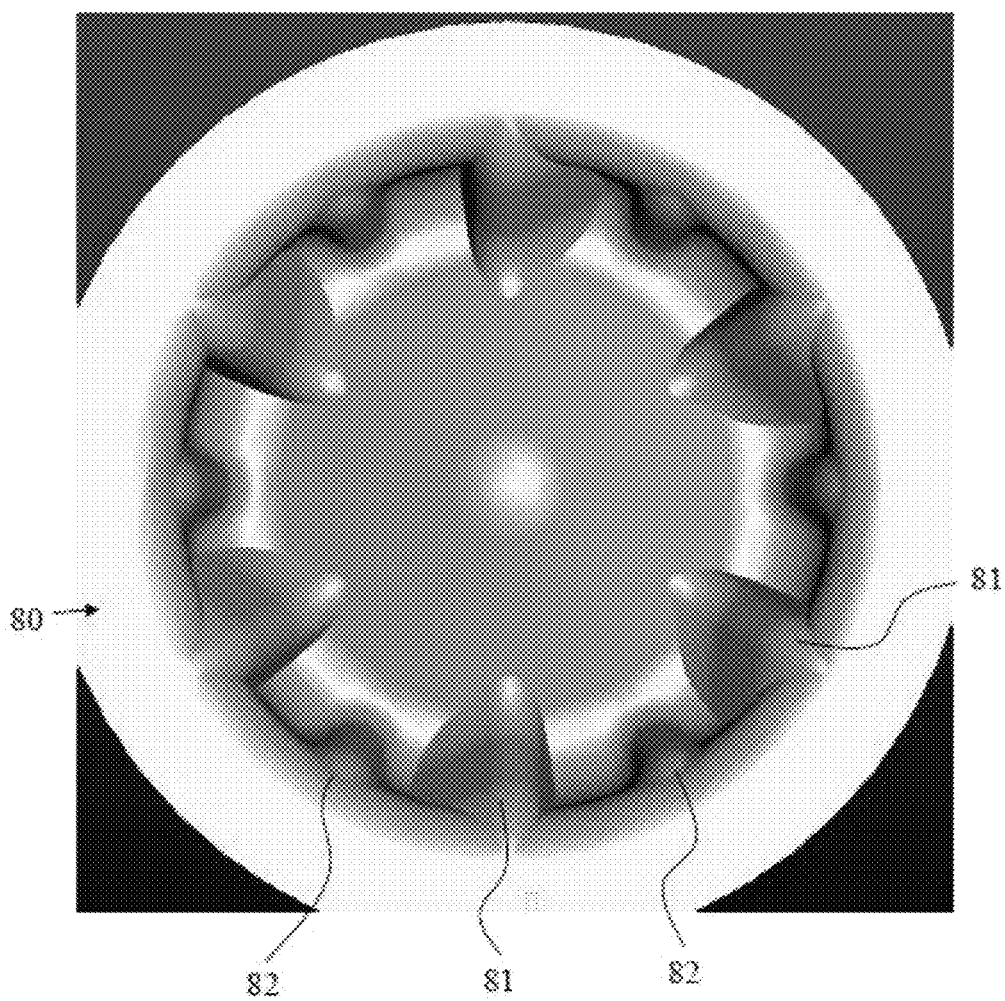
FIGS. 5 and 11 diagrammatically shows a three dimensional top view of a piston with protrusions according to the invention.
Figure 11:
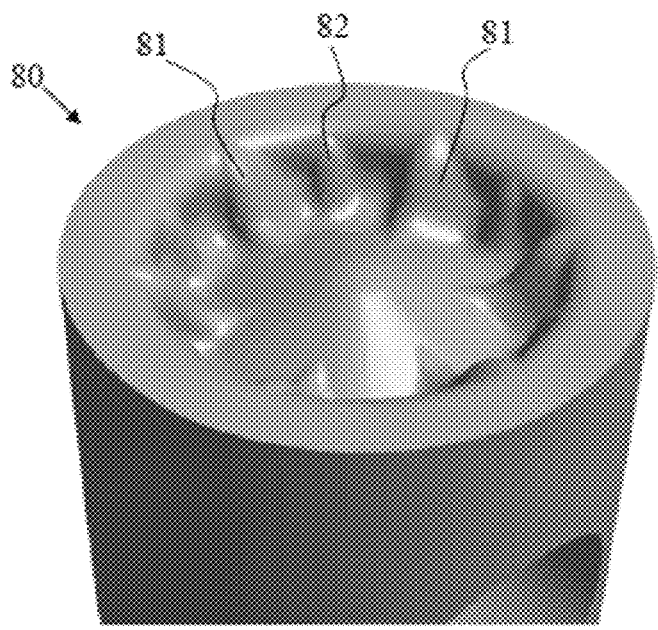

FIGS. 5 and 11 further illustrates how first type of protrusions 81 similar to the first type of protrusion 70 can be implemented in a piston 80. In FIGS. 5 and 11 an embodiment is disclosed where a second type of protrusions 82 is arranged in the impingement area, similar to the second type of protrusion 50 in FIG. 2b. As can be seen only the first type of protrusions 81 are shaped according to the invention.

Figure 4:
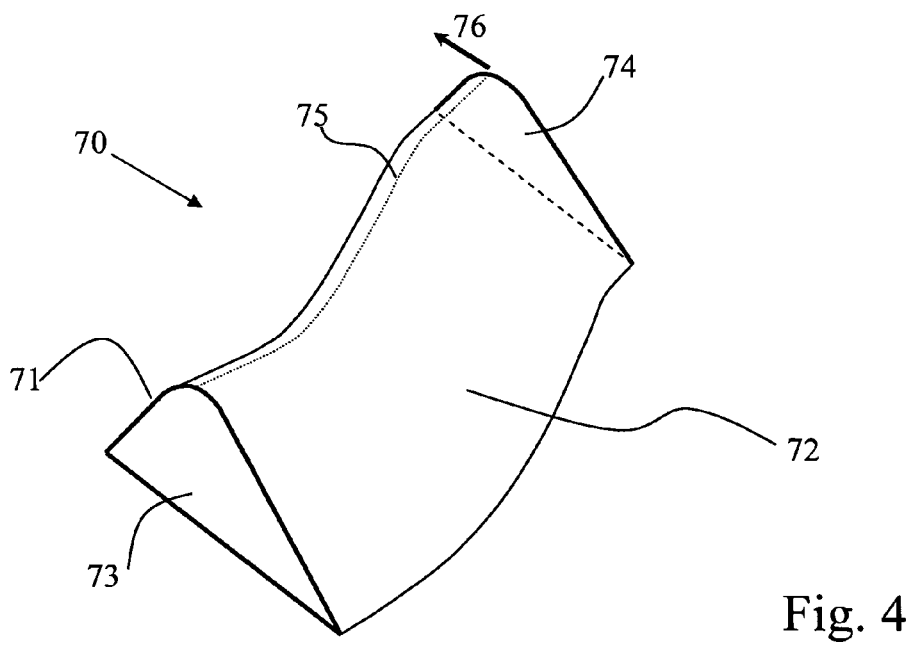
FIG. 4 diagrammatically shows a three dimensional view of one protrusion according to the invention.

As can be seen in FIGS. 3 to 5, and according to the invention the left side flank is formed differently compared to said right side flank. The effect of this is that the movement of a flame plume progressing towards said left side flank in a plane perpendicular to said reciprocal movement can be redirected differently compared to corresponding flame plume progressing towards said right side flank.

Figure 6:
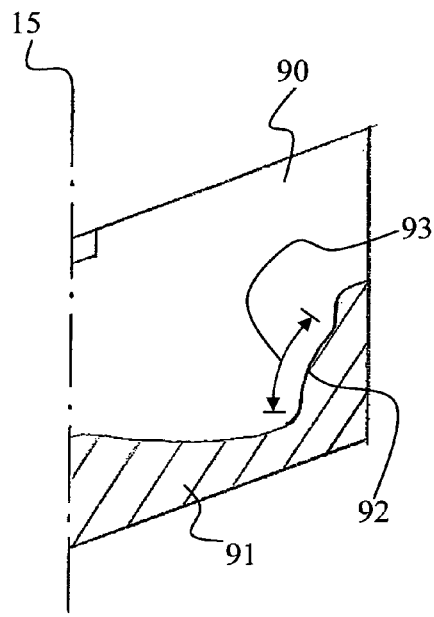
FIGS. 6 to 9 disclose schematically geometrical planes with which the extension of a top of a protrusion or ridge can coincide according to different embodiments of the invention.

In FIG. 4 the top of said ridge 75 is defined as a line where the surface of the top of said ridge in its extension is closest to the injector. In an embodiment of the invention said top of the ridge 75 can have a form that is swept to a right or left direction, when seen from said injector and in a plane perpendicular to said reciprocal movement. As exemplified in FIG. 4 the top of the ridge 75 is swept to the left (as indicated by arrow 76), which results in that the right side flank showing a bigger surface compared to the left side flank 71. The extension of said top of the ridge 75 follows a plane that is parallel to said reciprocal movement and where said plane coincide with a geometrical central axis of the combustion engine cylinder. This has been further illustrated in FIG. 6 where the geometrical central axis 15 of the combustion engine cylinder is disclosed and a plane 90 that is parallel to said reciprocal movement and where said plane coincide with the geometrical central axis 15. As can be seen said plane 90 cuts through a piston, where only a slice 91 of said piston that appears in said plane has been drawn. A corresponding top of ridge 92 has been illustrated as well, and where the extension of said ridge or top of said ridge is marked by an arrow 93.

A further beneficial effect of said top of the ridge being swept to a right or left direction can be seen in the exemplified embodiment of FIG. 3 where the arrow 64 indicate that since both flows are redirected more to the left, instead of towards the geometrical central axis 15 of the combustion engine cylinder, a global flow 64 can be created that circulates the cylinder gases around in the piston bowl.

Figure 7:
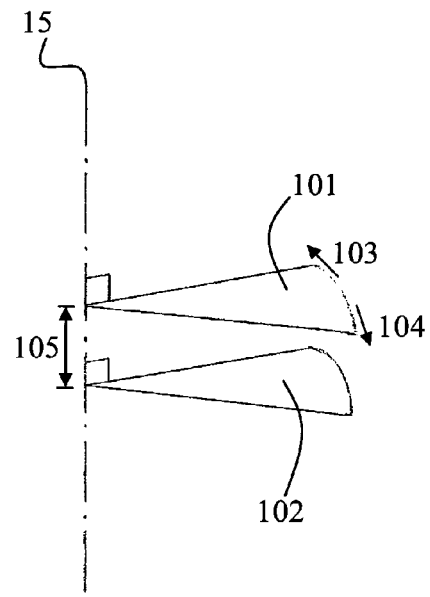

In a further embodiment of the invention the top of a ridge can have an upper part and a lower part. As illustrated in FIG. 7 said upper part of said ridge (not disclosed), positioned away from the bottom of a piston bowl, can have a form that is swept in one first direction (103 or 104) in a plane 101 perpendicular to an axis (15) of reciprocation of the piston and when seen from said injector. A lower part of said ridge (not disclosed), positioned close to said bottom of said piston bowl, can have a form that is swept in an opposite direction (103 or 104) to said first direction when seen from said injector and in another plane 102 perpendicular to said axis of reciprocation of the piston. A distance 105 parallel to an axis 15 of reciprocation of the piston and between said planes can be at least half of a total length (for example 93) of said ridge.

Figure 8:
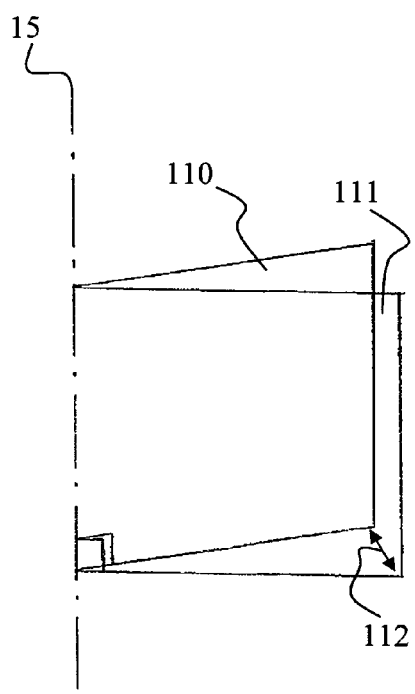

In a further embodiment of the invention illustrated through FIGS. 7 and 8 said upper or lower parts swept in said first direction (103 or 104) can have as first top of ridge section (not disclosed in FIGS. 7 and 8) where extension of said first top of ridge section coincides with a first plane (110 or 111) that is parallel to said reciprocal movement and where said first plane coincides with said geometrical central axis 15 of the combustion engine cylinder, and where the other of said upper or lower parts swept in said opposite direction having a second top of ridge section (not disclosed in FIGS. 7 and 8) where extension of said second top of ridge section coincides with a second plane (110 or 111) that is also parallel to said reciprocal movement and where said second plane also coincides with said geometrical central axis 15 of the combustion engine cylinder. A first distance 112 between said first plane (e. g 110) and said second plane (e. g. 111), measured substantially at a position of said ridge (or first type of protrusion), can be less than a second distance corresponding to a base width of said first type of protrusions at a portion of said first type of protrusions having the biggest width. The width 43 in FIG. 2a gives an example of where said base width can be measured.

Figure 10:
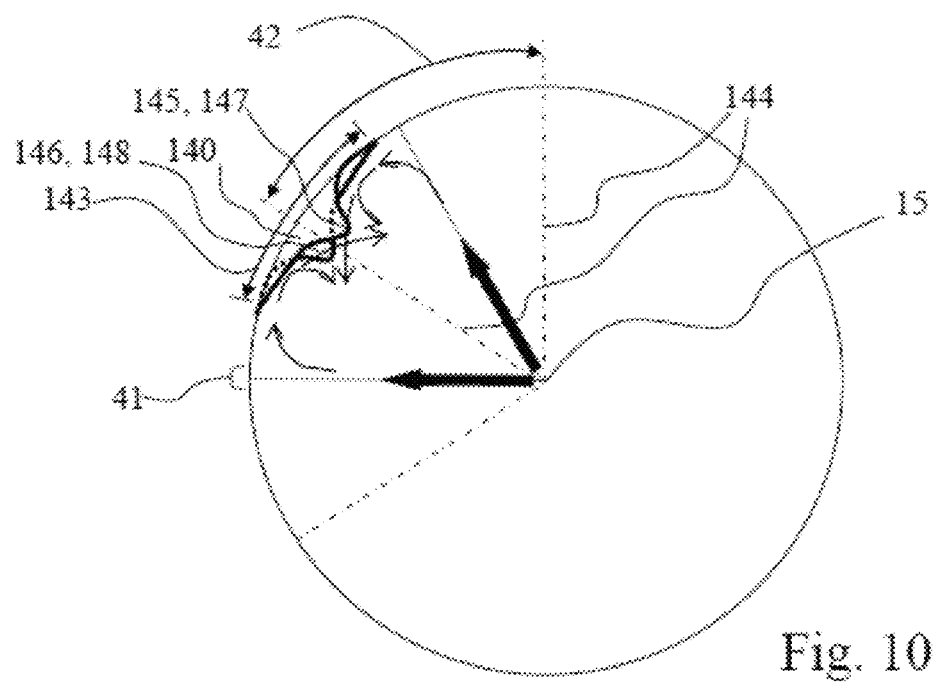
FIG. 10 diagrammatically shows a top view of the piston according to another embodiment of the invention with spray/flame flows.

FIG. 10 discloses an embodiment of the invention based on what has been explained especially in connection to the FIGS. 7 and 8. FIG. 10 discloses a first type of protrusion 140 having a base width 143 and where said protrusion 140 extends in a plane 144 parallel to said geometrical central axis 15 of the combustion engine cylinder. Only one such first type of protrusion 140 is disclosed but, in this example, six such first type of protrusions are evenly distributed, and arranged around in the piston bowl. Thus, there are six planes 144, and there are also six corresponding impingement areas 41 (as in FIG. 2a) in the exemplified piston. In this view from above an upper part 145 of the protrusion is swept to the right when seen from the injector. Said protrusion has a first top of ridge section 147 where extension of said first top of ridge section coincides with a first plane (corresponding to a plane 111) that is parallel to said reciprocal movement and where said first plane coincides with said geometrical central axis 15 of the combustion engine cylinder. A lower part 146 is swept in the opposite direction, that is to the left, and having a second top of ridge section 148 where extension of said second top of ridge section coincides with a second plane (corresponding to a plane 110) that is also parallel to said reciprocal movement and where said second plane also coincides with said geometrical central axis 15 of the combustion engine cylinder. The upper part of the flame plume coming from the right of the protrusion 140 will be directed more to the right of said geometrical central axis 15 of the combustion engine cylinder. The lower part of the flame plume coming from the right of the protrusion 140 will be directed more to the left of said geometrical central axis 15 of the combustion engine cylinder. In a corresponding way the upper part of the flame plume coming from the left of the protrusion 140 will be directed more to the right of said geometrical central axis 15 of the combustion engine cylinder, and the lower part of the flame plume coming from the left of the protrusion 140 will be directed more to the left of said geometrical central axis 15 of the combustion engine cylinder.

A top transition section (not disclosed) of said ridge can be arranged between said upper and lower top of ridge sections 147 and 148. The shape of said top transition section can have a smooth form when the top of said ridge changes sweep from right to left (or opposite direction). Said top transition section can have a length up to approximately ⅓ of the total length of said ridge. If the distance 112 between said planes 111 and 110 in the position of said top of ridge is small then a shorter transition section can be shaped, or alternatively less sharp, that is, with a smoother form.

Figure 9:
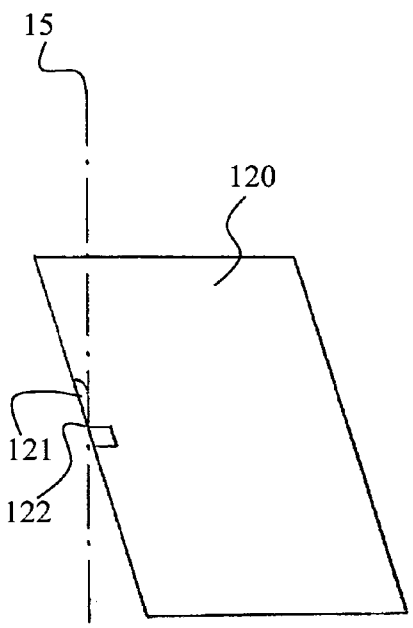

In another embodiment of the invention disclosed through FIG. 9 an extension of said top of said ridge can coincide with a plane 120 that has an angle 121 to a geometrical central axis 15 of the combustion engine cylinder and where said plane 120 coincides only in one point 122 with said geometrical central axis 15 of the combustion engine cylinder. Said angle can be selected in an interval between 0 and 30 degrees. FIG. 10 can also be used in order to illustrate this embodiment. Said plane 120 can coincide with both the top of ridge sections 147 and 148, since said top of ridge sections 147 and 148 are positioned in different planes, corresponding to said planes 101 an 102. Thus, the protrusion of this embodiment can be seen as a protrusion similar to the protrusion disclosed in FIGS. 4 and/or 5 but oblique with an angle 121.

Hence, the flame plume propagating from the left has a different experience compared to the flame plume propagating from the right. According to this embodiment a flame plume propagating, for example, from the left can be redirected basically as the main flow 45 in FIG. 2a when seen from above, but when seen in a plane perpendicular to said geometrical central axis 15 of the combustion engine cylinder said main flow would be redirected slantingly upwards or slantingly downwards, depending on in which direction the protrusion is angled (according to an angle 121).

Hence, if a first main flow (corresponding to 45) is redirected slantingly upwards then the other main flow (corresponding to 44) coming from the opposite direction will be redirected slantingly downwards. In a further embodiment of the embodiment illustrated through FIG. 9 said first type of protrusion can be shaped so that said main flows cross each other but in two different planes (corresponding to the planes 101 and 102).

A combination of the embodiments disclosed through FIGS. 7 to 9 is also possible. Thus, both planes 110 and 111 can be angled with an angle corresponding to the angle 121. In this way different degrees of redirections of main flows can be achieved;
  in a left/right direction compared to the geometrical central axis 15 of the combustion engine cylinder.
  in an upwards/downwards direction when seen in a plane perpendicular compared to the geometrical central axis 15 of the combustion engine cylinder.

In alternative embodiments of all above mentioned embodiments a second type of protrusions (similar to 82 and 50) can be arranged in the impingement area between said first type of protrusions. Said second type of protrusions can be adapted for redirecting flame progress directed towards the impingement area mainly into a circumferential flame progress direction in a plane substantially perpendicular to said reciprocal movement and with minimal flame-to-piston wall interaction and minimal kinetic energy loss.

Said inventive pistons can be manufactured by machining, such as a turning lathe and/or a milling cutter, and/or by forging in order to shape said protrusions.

The present invention can be used in engines driven by fuels, such as for example diesel, DME (dimethyl ether) or the like.

Note that the terms "geometrical centre of said combustion chamber", "center axis of the piston' or "geometrical central axis of the combustion engine cylinder" can all be designated number 15 in the figures.

The invention should not be deemed to be limited to the embodiments described above, but rather a number of further variants and modifications are conceivable within the scope of the following patent claims.

The invention claimed is:

1. A piston positioned for reciprocal movement in a combustion engine cylinder between a bottom dead center position and a top dead center position, the piston including a piston crown comprising an upper surface facing a combustion chamber, the piston crown containing a piston bowl formed by an outwardly opening cavity, the piston bowl comprising an outwardly flared outer bowl section having a concave curvilinear shape in cross section, at least one intake port arranged to provide the combustion chamber with intake air substantially without swirl, an injector arranged to inject fuel into the combustion chamber from a position adjacent a geometrical centre of the combustion chamber and having an impingement area of a progressing flame plume in the outer bowl section, and where substantially half way between the impingement areas and in a plane substantially perpendicular to the reciprocal movement are arranged a first type of protrusions protruding into the combustion chamber from the outer bowl section and having a smooth form shaped for preserving kinetic energy in a flame plume and where each of the first type of protrusions has a shape of a longitudinal ridge that extends only in the outer bowl section, and where the first type of protrusions having a left side flank and a right side flank of the ridge when seen from the injector, and where the left side flank is formed differently compared to the right side flank in order to redirect the movement of a flame plume progressing towards the left side flank in a plane perpendicular to the reciprocal movement differently compared to a corresponding flame plume progressing towards the right side flank, wherein an upper part of the ridge, positioned away from a bottom of the piston bowl, having a form that is swept in one first direction in a plane perpendicular to an axis of reciprocation of the piston and when seen from the injector, and a lower part of the ridge, positioned close to the bottom of the piston bowl, having a form that is swept in an opposite direction to the first direction when seen from the injector and in another plane perpendicular to the axis of reciprocation of the piston, and where a distance parallel to an axis of reciprocation of the piston and between the planes is at least half of a total length of the ridge.

2. A piston as in claim 1, wherein one of the upper or lower parts swept in the first direction having a first top of ridge section where extension of the first top of ridge section coincides with a first plane that is parallel to the reciprocal movement and where the first plane coincides with the geometrical central axis of the combustion engine cylinder, and where the other of the upper or lower parts swept in the opposite direction having a second top of ridge section where extension of the second top of ridge section coincides with a second plane that is also parallel to the reciprocal movement and where the second plane also coincides with the geometrical central axis of the combustion engine cylinder, and where a first distance between the first plane and the second plane, measured substantially at a position of the ridge or first type of protrusion, is less than a second distance corresponding to a base width of the first type of protrusions at a portion of the first type of protrusions having the biggest width.

3. A piston as in claim 1, wherein having a top of the ridge where extension of the top of the ridge coincides with a plane having an angle to a geometrical central axis of the combustion engine cylinder and where the plane coincides only in one point with the geometrical central axis of the combustion engine cylinder.

4. A piston as in claim 3, wherein the angle is between 0 and 30 degrees.

5. A piston as in claim 1, wherein a second type of protrusions is arranged in the impingement area between the first type of protrusions, and where the second type of protrusions being shaped for redirecting flame progress directed towards the impingement area mainly into a circumferential flame progress direction in a plane substantially perpendicular to the reciprocal movement and with minimal flame-to-piston wall interaction and minimal kinetic energy loss.

6. A piston as in claim 1, wherein the first type of protrusions are shaped fir redirecting circumferential flame progress mainly towards a center axis of the piston with minimal flame-to-flame interaction.

* * * * *